United States Patent
Kim et al.

(10) Patent No.: US 12,074,977 B2
(45) Date of Patent: Aug. 27, 2024

(54) CONSTRUCTION MACHINE CONTROL SYSTEM AND CONSTRUCTION MACHINE CONTROL

(71) Applicant: HD HYUNDAI INFRACORE CO., LTD., Incheon (KR)

(72) Inventors: Jihoon Kim, Seoul (KR); Byoungheon Park, Incheon (KR); Wooseok Seo, Bucheon-si (KR)

(73) Assignee: HD HYUNDAI INFRACORE CO., LTD., Incheon (KR)

( * ) Notice: Subject to any disclaimer, the term of this patent is extended or adjusted under 35 U.S.C. 154(b) by 467 days.

(21) Appl. No.: 17/435,788

(22) PCT Filed: Mar. 12, 2020

(86) PCT No.: PCT/KR2020/003424
§ 371 (c)(1),
(2) Date: Sep. 2, 2021

(87) PCT Pub. No.: WO2020/184997
PCT Pub. Date: Sep. 17, 2020

(65) Prior Publication Data
US 2022/0150067 A1    May 12, 2022

(30) Foreign Application Priority Data
Mar. 12, 2019 (KR) .................. 10-2019-0028359

(51) Int. Cl.
*H04L 9/32* (2006.01)
*B60R 25/23* (2013.01)
(Continued)

(52) U.S. Cl.
CPC ............ *H04L 9/3226* (2013.01); *B60R 25/23* (2013.01); *B60R 25/24* (2013.01);
(Continued)

(58) Field of Classification Search
CPC ....... H04L 9/3226; B60R 25/23; B60R 25/24; B60R 2325/108; B60R 2325/205;
(Continued)

(56) References Cited

U.S. PATENT DOCUMENTS

2005/0099265 A1    5/2005   Dix et al.
2009/0207004 A1    8/2009   Ziska et al.
(Continued)

FOREIGN PATENT DOCUMENTS

EP      3 309 764 A1    4/2018
JP      2007-176320 A   7/2007
(Continued)

OTHER PUBLICATIONS

Extended European Search Report issued on Oct. 26, 2022, for corresponding European Patent Application No. 20771096.3 (7 pages).

(Continued)

Primary Examiner — Izunna Okeke
(74) Attorney, Agent, or Firm — Hauptman Ham, LLP

(57) ABSTRACT

In a method of registering a smart key for construction machinery, a first password is generated in a smart key module mounted in a construction machine. A user setting graphic interface through which a user can input a password, in the smart key module or a user terminal, is provided to the user. The password inputted by the user is compared with the first password in the smart key module to authenticate. An authentication code of a near smart key that is recognized by the smart key module is registered as a new registration authentication code when the inputted password is authenticated.

9 Claims, 14 Drawing Sheets

(51) Int. Cl.
*B60R 25/24* (2013.01)
*E02F 9/20* (2006.01)

(52) U.S. Cl.
CPC ... *B60R 2325/108* (2013.01); *B60R 2325/205* (2013.01); *E02F 9/20* (2013.01)

(58) Field of Classification Search
CPC ........ B60R 25/102; E02F 9/20; E02F 9/2054; E02F 9/205; B60Y 2200/41
See application file for complete search history.

(56) References Cited

U.S. PATENT DOCUMENTS

| | | |
|---|---|---|
| 2010/0241857 A1 | 9/2010 | Okude et al. |
| 2017/0337900 A1 | 11/2017 | Dai et al. |
| 2017/0374605 A1 | 12/2017 | Fontaine et al. |
| 2018/0319370 A1* | 11/2018 | Kim .................. B60R 25/25 |

FOREIGN PATENT DOCUMENTS

| | | |
|---|---|---|
| JP | 2015-214241 A | 12/2015 |
| KR | 10-1011148 B1 | 1/2011 |
| KR | 10-2014-0080764 A | 7/2014 |

OTHER PUBLICATIONS

International Search Report issued Jun. 18, 2020, corresponding to International Application No. PCT/KR2020/003424.

\* cited by examiner

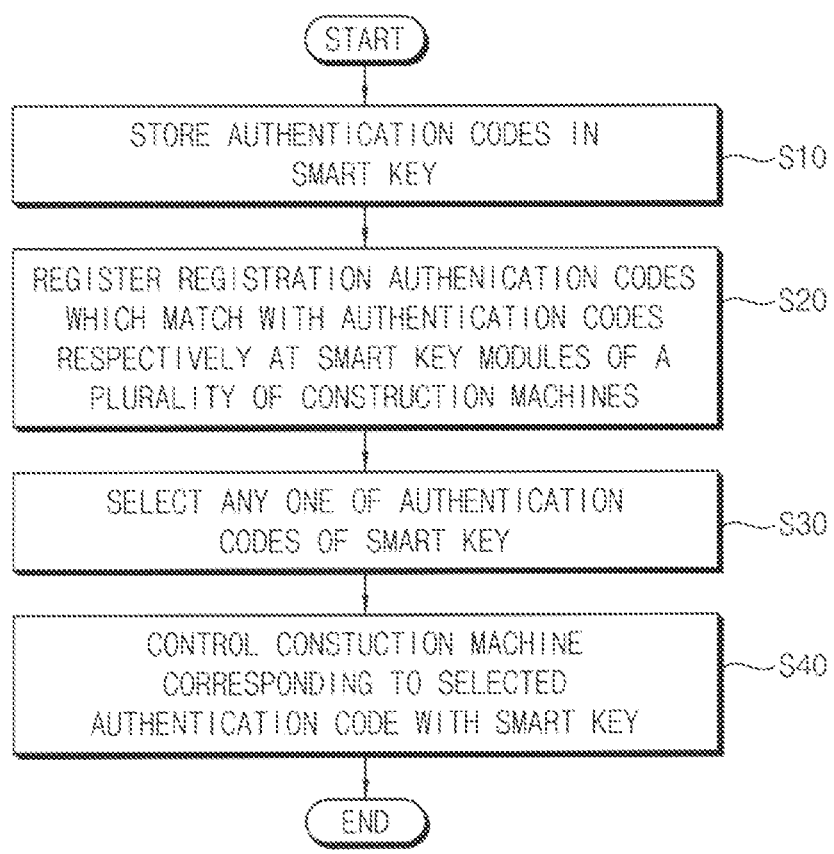

CONSTRUCTION MACHINE CONTROL SYSTEM AND CONSTRUCTION MACHINE CONTROL

CROSS-REFERENCE TO RELATED APPLICATION

This present application is a national stage filing under 35 U.S.C § 371 of PCT application number PCT/KR2020/003424 filed on Mar. 12, 2020, which is based upon and claims the benefit of priority to Korean Patent Application No. 10-2019-0028359 filed Mar. 12, 2019 in the Korean Intellectual Property Office. The disclosures of the above-listed applications are hereby incorporated by reference herein in their entireties.

TECHNICAL FIELD

The present invention relates to a control system for construction machinery and a control method for construction machinery. More particularly, the present invention relates to a control system for construction machinery using a smart key system and a control method for construction machinery using the same.

BACKGROUND ART

In construction machinery such as an excavator, a smart key system may be provided, so that an operational function such as vehicle door unlock, vehicle door lock, engine ignition, etc. may be performed while a user holds a smart key. However, when the user operates or manages a plurality of construction machines, it may be inconvenient to carry all of a plurality of smart keys for controlling the construction machines, and in this case, there is a problem in that the probability of losing the smart key becomes high.

DISCLOSURE OF THE INVENTION

Problems to be Solved

An object of the present invention provides a method of registering a smart key in a construction machine in order to manage a plurality of construction machines with at least one smart key.

Means to Solve the Problems

According to example embodiments, in a method of registering a smart key for construction machinery, a first password is generated in a smart key module mounted in a construction machine. A user setting graphic interface through which a user can input a password, in the smart key module or a user terminal, is provided to the user. The password inputted by the user is compared with the first password in the smart key module, to authenticate. An authentication code of a near smart key that is recognized by the smart key module is registered as a new registration authentication code when the inputted password is authenticated.

In example embodiments, generating the first password may include creating cryptographic variables by combining construction machinery information, date and time.

In example embodiments, generating the first password may include creating cryptographic variables using AES algorithm or RSA algorithm.

In example embodiments, the method may further include, when the user setting graphic interface in the smart key module is provided, generating and providing a second password identical to the first password, in the user terminal, to the user.

In example embodiments, generating the second password may include creating cryptographic variables by combining construction machinery information, date and time.

In example embodiments, generating the second password may include creating cryptographic variables using AES algorithm or RSA algorithm.

In example embodiments, the method may further include, when the user setting graphic interface in the user terminal is provided, transmitting the password inputted by the user to a server by the user terminal, and receiving the password inputted by the user from the server in the smart key module.

In example embodiments, receiving the inputted password from the server in the smart key module may include receiving the inputted password through a remote management device which communicates wirelessly with the server.

In example embodiments, registering the authentication code of the near smart key that is recognized by the smart key module as a new registration authentication code may include transmitting an authentication signal in the smart key module to an area around the construction machine, and receiving a response signal in response to the authentication signal to register an activated authentication code of the near smart key.

In example embodiments, registering the activated authentication code of the near smart key may include storing a plurality of authentication codes in the smart key, and activating any one of the authentication codes.

Effects of the Invention

According to example embodiments, identical passwords may be generated in a smart key module and a user terminal respectively and the generated password may be inputted through another device (user terminal or smart key module) and authenticated, to thereby allow the user to easily register the smart key at the smart key module mounted on the construction machine using the user terminal such as a mobile phone while maintaining security. Security may be enhanced using AES encryption. Further, regardless of whether the communication of the user terminal is available or not, the smart key registration may be performed while maintaining security thoroughly.

However, the effect of the invention may not be limited thereto, and may be expanded without being deviated from the concept and the scope of the present invention.

BRIEF DESCRIPTION OF THE DRAWINGS

FIG. 6 is a flow chart illustrating a control method for construction machinery in accordance with example embodiments.

BEST MODE FOR CARRYING OUT THE INVENTION

Figure 1:
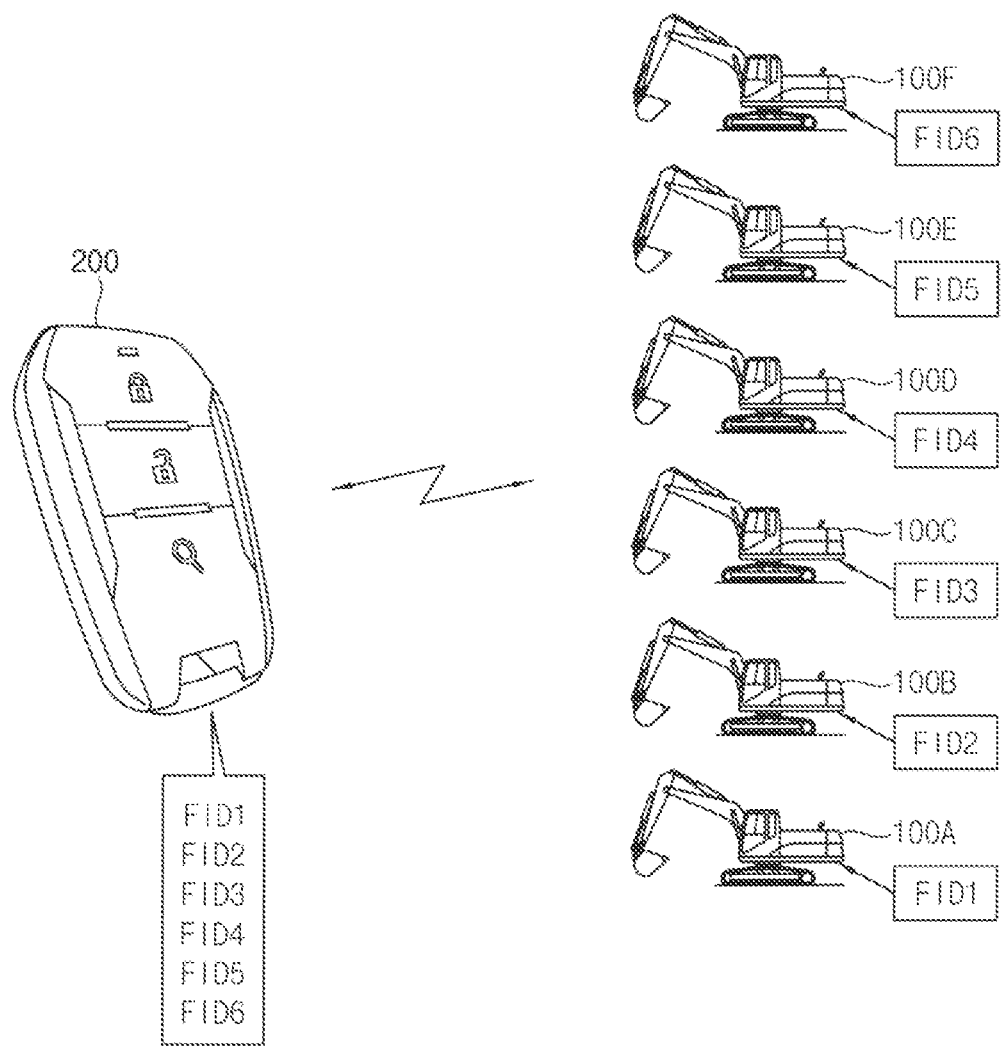
FIG. 1 is a view illustrating a control system for construction machinery in accordance with example embodiments.

Hereinafter, preferable embodiments of the present invention will be explained in detail with reference to the accompanying drawings.

In the drawings, the sizes and relative sizes of components or elements may be exaggerated for clarity.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments may, however, be embodied in many different forms and should not be construed as limited to example embodiments set forth herein. Rather, these example embodiments are provided so that this disclosure will be thorough and complete, and will fully convey the scope of example embodiments to those skilled in the art.

Figure 2:
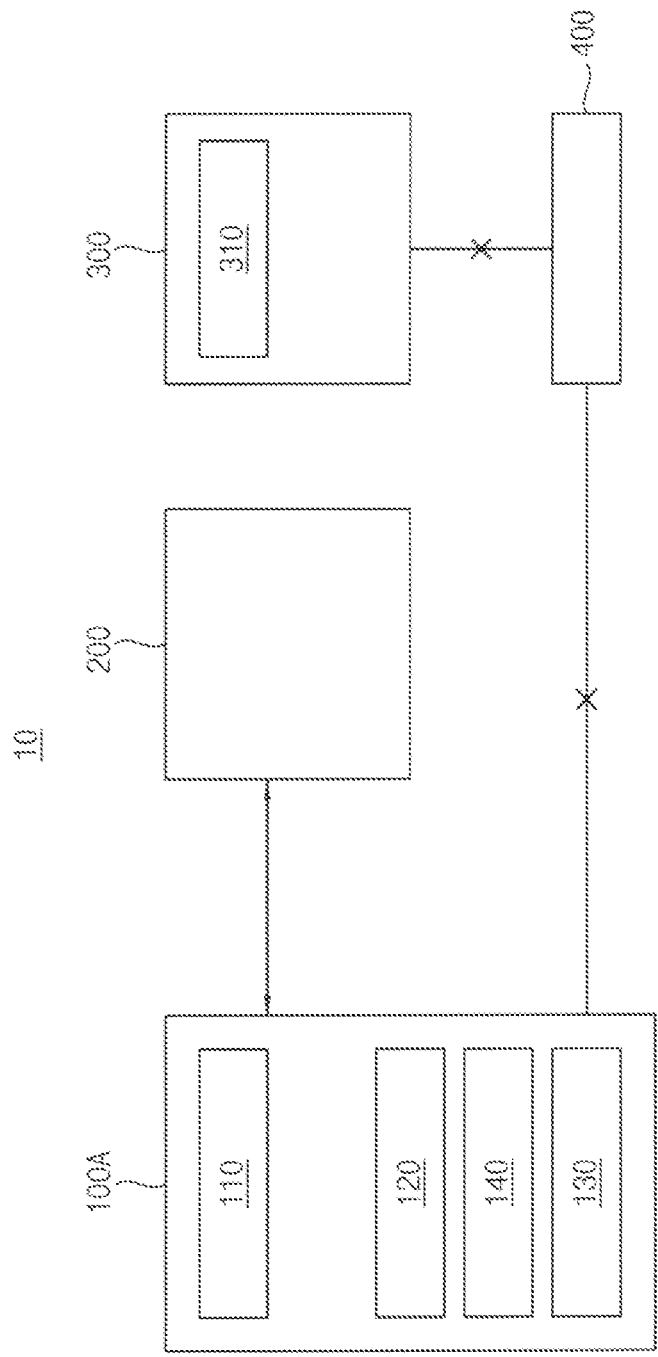
FIG. 2 is a block diagram illustrating the control system for construction machinery in FIG. 1.
Figure 3:
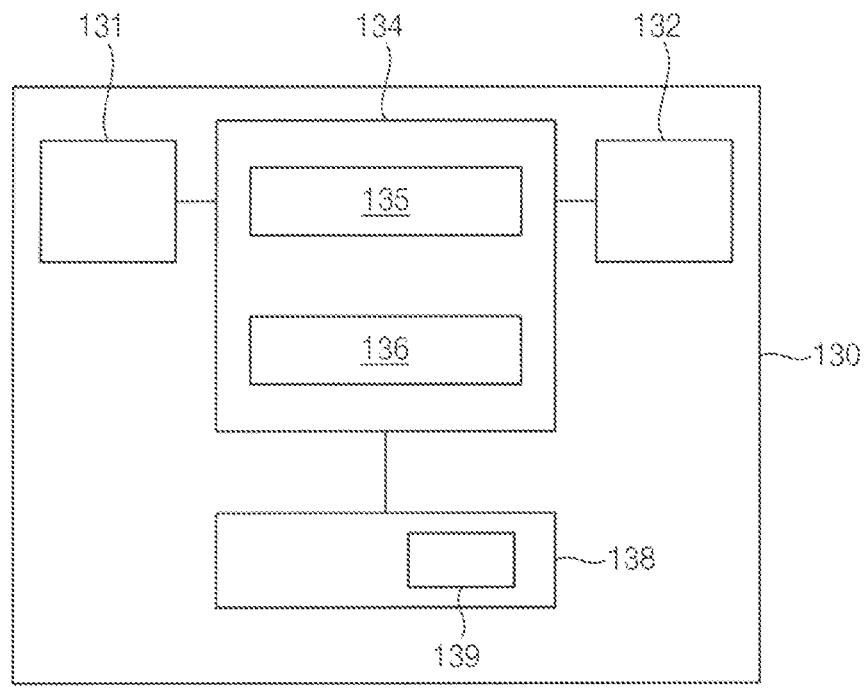
FIG. 3 is block diagram illustrating a smart key module of the control system for construction machinery in FIG. 1.
Figure 4:
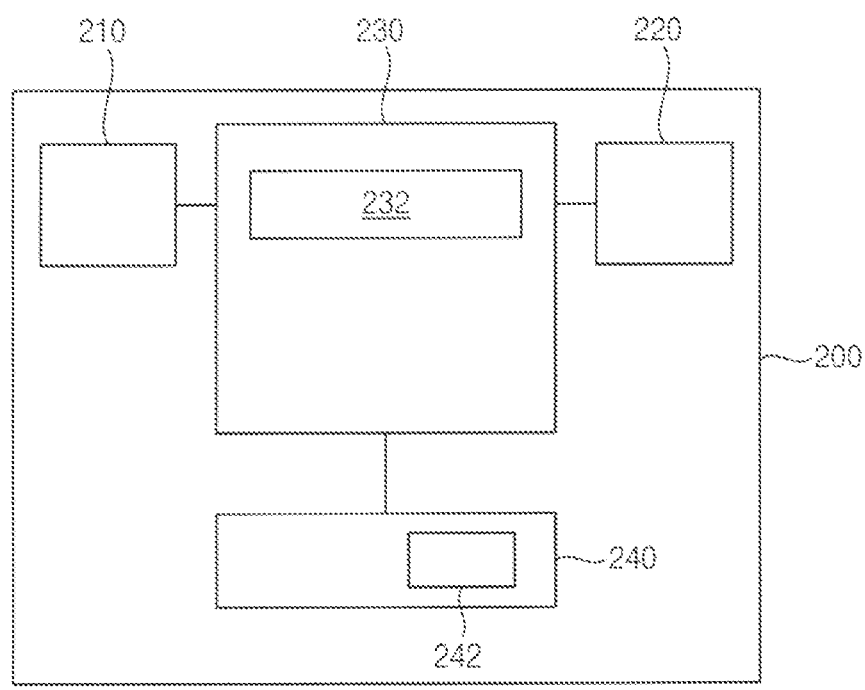
FIG. 4 is a block diagram illustrating a smart key of the control system for construction machinery in FIG. 1.
Figure 5:
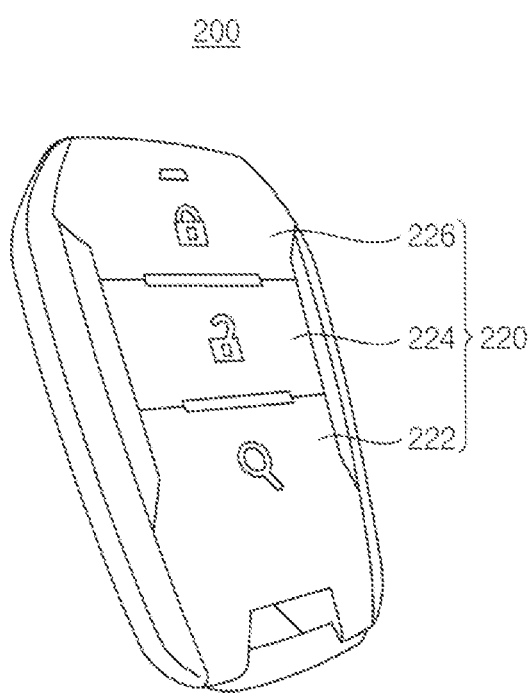
FIG. 5 is a perspective view illustrating the smart key in FIG. 4.

FIG. 1 is a view illustrating a control system for construction machinery in accordance with example embodiments. FIG. 2 is a block diagram illustrating the control system for construction machinery in FIG. 1. FIG. 3 is block diagram illustrating a smart key module of the control system for construction machinery in FIG. 1. FIG. 4 is a block diagram illustrating a smart key of the control system for construction machinery in FIG. 1. FIG. 5 is a perspective view illustrating the smart key in FIG. 4.

Referring to FIGS. 1 to 5, a control system for construction machinery 10 may include at least one smart key (FOB) 200 configured to selectively control a plurality of construction machines 100A, 100B, 100C, 100D, 100E, 100F and smart key modules 130 respectively installed in the construction machines 100A, 100B, 100C, 100D, 100E, 100F to communicate wirelessly with the smart key 200. Additionally, the control system for construction machinery 10 may further include a user terminal 300 configured to provide a graphic interface for performing user settings for the construction machine.

In example embodiments, the construction machine may include an excavator, a wheel loader, a forklift, etc. Hereinafter, it will be explained that example embodiments may be applied to the excavator. However, it may not be limited thereto, and it may be understood that example embodiments may be applied to other construction machine such as the wheel loader, the forklift, etc. The smart key module 130 may be installed in the construction machine, and may communicate with the smart key 200 to perform a smart key function.

The smart key (FOB) may store a plurality of authentication codes FIB1, FID2, FID3, FID4, FID5, FID6 and may be operable of activating any one of the authentication codes. Each of the construction machines 100A, 100B, 100C, 100D, 100E, 100F may include the smart key module 130. Each of the smart key modules 130 may communicate wirelessly with the smart key 200 and may include registration authentication codes which match with the registration authentication codes respectively (in one to one correspondence).

The smart key 200 as the fob key of a smart key system may transmit and receive information with the smart key module 130. The transmissions of the information may be performed using at least one of wireless signals such as a low frequency (LF) signal, a radio frequency (RF) signal, etc. When the smart key 200 receives a search signal from the smart key module 130, the smart key 200 may be configured to transmit a response signal in response to the search signal. For example, the search signal may be an LF (low frequency) signal (for example, 125 kHz), and the response signal may be a RF (radio frequency) signal (for example, 315 MHz, 433 MHz, etc). The search signal may include information requesting the authentication code, and the response signal may include information on the authentication code corresponding to the search signal.

When the smart key module 130 receives a control signal for controlling the construction machine, the smart key module 130 may transmit the search signal for searching a smart key 200 near the smart key module 130 and may receive the response signal from the smart key 200. The smart key module 130 may authenticate whether or not a registration authentication code included in the response signal matches with a pre-stored registration authentication code. If the registration authentication code included in the response signal matched with the pre-stored registration authentication code, the smart key module 130 may perform an operational function such as vehicle door unlock, vehicle door lock, engine ignition, etc. corresponding to the received control signal.

As illustrated in FIG. 2, the construction machine 100A may receive a control signal from the smart key 200 or a remote control server 400, and may perform an operational function corresponding to the received control signal. For example, the construction machine 100A may include a GPS module 110, a remote management device 120, a user interface device 140 and a smart key module 130.

The GPS module 110 may include a GPS (global positioning system) receiver. The GPS module 110 may receive a signal transmitted from a GPS satellite to calculate a current location of the construction machine 100A and to generate construction machine location information.

The remote management device 120 may communicate directly with an external device, for example, the remote control server 400 or through a network connected to the remote control server 400 in order to remotely control the construction machine 100A. The network connected to the remote control server 400 may include at least one of a conventional wireless communication network and a wired communication network. The remote management device 120 may transmit the construction machine location information to the remote control server 400. Additionally, the remote management device 120 may receive a remote control signal from the remote control server 400. As described later, the smart key module 130 may receive a password, which is inputted to the user terminal 300, from the remote control server 400. For example, the remote management device 120 may include a TMS (Tele-Management System) module.

The smart key module 130 may receive the control signal such as an engine ignition signal to perform the operational function corresponding to the received remote control signal. Additionally, as described later, the smart key module 130 may be connected to the remote management system 120 to receive the password which is inputted to the user terminal 300. The GPS module 110, the remote management device 120 and the smart key module 130 may communicate with each other using CAN (Controller Area Network) communication. The smart key module 130 may be provided integrally with a vehicle control unit (VCU) or an engine control unit (ECU) for an overall control of the construction machine or may be provided as a separate control unit. When the operational function of the construction machine corresponding to the received remote control signal is required to be performed, the smart key module 130 may transmit a signal requesting the operational function of the construction machine to the vehicle control unit or the engine control unit. In case that the smart key module 130 is provided integrally with the vehicle control unit to perform the function of the vehicle control unit, the smart key module 130 may directly output the control signal to a driving portion for the required operational function.

The user interface device 140 may be configured in the form of an information output device for outputting information to the user and an information input device for allowing the user to inputting information, and a display device and the information input device may be provided integrally with each other to be in the form of a display unit of an instrument panel that can provide user setting graphic interface. The user interface device 140 may be connected to an input portion 132 of the smart key module 130 through CAN network, and may be provided integrally with the input portion 132.

As illustrated in FIG. 3, the smart key module 130 may include a communication portion 131, an input portion 132, a module controller 134 and a module storage portion 138.

The communication portion 131 may include at least one information transceiver module configured to search for a smart key 200 near the smart key module 130 and to certificate. In example embodiments, the information transceiver module may include an LF communication module having an LF antenna and a RF transceiver module having a RF antenna. In case that the LF antenna and the RF antenna are included, the LF antenna may transmit the search signal (LF signal) and the RF antenna may receive the response signal (RF signal).

The input portion 132 may be a port connected to the user interface device 140 which is used to register the authentication code of the smart key 200 activated by a user to the smart key module 130, and may be the user interface device 140 itself. The user may select a registration mode for registering the user's activated authentication code of the smart key 200 through the user interface device 140, and may input a password that is required to be inputted for registration of the authentication code. The input portion 132 may receive the mode selection information and the information related to the password from the user interface device 140 and may transmit to the module controller 134.

The module controller 134 may be a central control device of the smart key module capable of executing a control program for general smart key operation. The module controller 134 may execute a control program for smart key registration for registering an activated authentication code of the smart key 200. In particular, the module controller 134 may include a first password generation portion 135 for generating a first password in the smart key registration mode and an authentication portion 136 for comparing the generated first password with the password which is inputted through the input unit 132. In example embodiments, the first password generated by the first password generation portion 135 by the selection of the user in the smart key registration mode may be provided to the user through the user interface device 140.

The module storage portion 138 may include a program region for storing the control program for the general smart key operation and the control program for the smart key registration and a temporary region for storing data generated during the execution of the control program. Additionally, the module storage portion 138 may include a registration authentication code data area 139 for storing the activated authentication code of the smart key 200 as a new registration authentication code when authenticated by the authentication portion 136. A plurality of the authentication codes of the smart key 200 may be stored in the registration authentication code data area 139. Thus, a plurality of smart keys for which an authentication procedure, which will be described later, is completed, may be registered to one construction machine, thereby providing conveniences for management when each construction machine is managed by a plurality of personnel.

As illustrated in FIG. 4, the smart key 200 may include a communication portion 210, an input portion 220, a smart key controller 230 and a smart key storage portion 240.

The communication portion 210 may include at least one information transceiver module configured to transmit and receive information with the smart key module 130 installed in the construction machine. The information transceiver module may include an LF communication module and a RF transceiver module.

The input portion 220 may include an operation selection portion for smart key operation and smart key activation. As illustrated in FIG. 5, the input portion 132 may include a selection button 222 for authentication code selection, a first operation selection button 224 for vehicle door unlock, a second operation selection button 226 for vehicle door lock, etc.

The user may select and activate any one of the authentication codes stored in the smart key 200 by clicking the selection button 222. The construction machine including the smart key module 130 having a registration authentication code which matches with the activated authentication code installed therein may be controlled by the smart key 200. In example embodiments, each time the selection button 222 is clicked, the stored authentication codes may be sequentially activated, and the repeated click of the selection button 222 may be continued until the authentication code corresponding to the construction machine which the user wants is activated.

When the user selects any one of the stored authentication codes (e.g., FID1) through the selection button 222, an alarm device (lamp or horn) of the construction machine (e.g., 100A) that matches with the activated authentication code may operate for a predetermined time.

The smart key controller 230 may execute a control program for general smart key operation. The smart key controller 230 may execute a control program for smart key registration for registering an activated authentication code of the smart key 200. In particular, the smart key controller 230 may include an authentication code processor 232 configured to activate an authentication code signal activated by the selection button and transmit through the communication portion 210.

The smart key storage portion 240 may include a program region for storing the control program for the general smart key operation and the control program for the smart key registration and a temporary region for storing data generated during the execution of the control program. Additionally, the smart key storage portion 240 may include an authentication code data area 139 for storing a plurality of authentication codes and an authentication code activated by the authentication code processor 232.

Referring again to FIG. 2, the user terminal 300 may generate construction machine control information for remotely controlling the construction machine. The user terminal 300 may provide a user with a graphic interface for registering the activated authentication code of the smart key 200. For example, the user terminal 300 may include a smart phone, a smart pad, PDA, etc. In some embodiments, the user terminal 300 may include a construction machine control application (APP) 310.

The construction machine control APP 310 may provide a user with an interface for generating the construction machine control information. The construction machine control APP 310 may provide the user with a smart key registration interface for registering the smart key.

In particular, the user terminal 300 may include an input portion and a terminal controller. The input portion of the user terminal 300 may be configured in the form of an information output device and an input device that can provide user setting graphic interface, and may transmit information corresponding to user's manipulation of the input device based on the information outputted from the information output device to a terminal controller. Similarly to the user interface device of the smart key module as described above, the input portion of the user terminal 300 may be configured that the terminal controller is connected to a display device that can provide information output and input. The terminal controller may include a second password generation portion for generating a second password. The second password may be identical to the first password which is generated by the first password generation portion 135. The second password generated by the second password generation portion may be provided to a user through the input portion of the user terminal 300.

In example embodiments, the first and second password generation portions may create cryptographic variables using AES (advance encryption standard) algorithm or RSA (Rivest Sharmir Adleman) algorithm. The first and second password generation portions may generate the passwords by combining construction machine information, date and time.

In example embodiments, a user may select the smart key registration mode and then input a password, and information of the password may be inputted to the terminal controller through the input portion. In this case, the user terminal 300 may transmit the inputted password to the remote control server 400, and the remote control server 400 may transmit the password inputted to the user terminal 300 to the smart key module 130 through the remote management device 120.

Hereinafter, a method of controlling the construction machine using the control system for construction machinery in FIG. 1 will be explained.

FIG. 6 is a flow chart illustrating a control method for construction machinery in accordance with example embodiments.

Referring to FIGS. 1 to 6, first, a plurality of authentication codes FID1, FID2, FID3, FID4, FID5, FID6 may be stored in the smart key 200 (S10), and registration authentication codes which match with the authentication code respectively may be registered respectively in the smart key modules 130 which are installed in a plurality of construction machines 100A, 100B, 100C, 100D, 100E, 100F (S20). Then, any one of the authentication codes of the smart key 200 may be selected (S30), and the construction machine corresponding to the selected authentication code may be controlled with the smart key 200 (S40).

In example embodiments, a plurality of the authentication codes FID1, FID2, FID3, FID4, FID5, FID6 may be stored in the smart key storage portion 240 of the smart key 200. Stages of registering the registration authentication codes which match with the authentication codes respectively in the smart key modules 130 of a plurality of the construction machines 100A, 100B, 100C, 100D, 100E, 100F will be described later.

Then, a user may select and activate any one of the authentication codes of the smart key 200 by clicking the selection button 222. The construction machine including the smart key module 130 having the registration authentication code which matches with the activated authentication code may be controlled by the smart key 200.

When the user selects any one of the stored authentication codes (e.g., FID1) through the selection button 222, an alarm device (lamp or horn) of the construction machine (e.g., 100A) that matches with the activated authentication code may operate for a predetermined time.

When the user clicks the selection button 222 of the smart key 200 again to select another one of the stored authentication codes (e.g., FID2), an alarm device (lamp or horn) of the construction machine (e.g., 100B) that matches with the activated authentication code may operate for a predetermined time.

As mentioned above, a plurality of the authentication codes FID1, FID2, FID3, FID4, FID5, FID6 may be stored in the smart key 200 and the smart key may be operable that any one of the authentication codes may be activated. A plurality of the smart key modules 130 installed respectively in a plurality of the construction machines 100A, 100B, 100C, 100D, 100E, 100F may have the registration authentication codes which match with the authentication codes respectively. When the user activates any one of the authentication codes of the smart key 200, the construction machine including the smart key module 130 having the registration authentication code which matches with the activated authentication code installed therein may be controlled by the smart key 200.

Accordingly, several construction machines 100A, 100B, 100C, 100D, 100E, 100F may be selectively and remotely controlled by one smart key 200. Thus, in case that the user operates or manages a plurality of the construction machines, by carrying one smart key, it may be possible to eliminate the inconvenience of carrying a plurality of smart keys or losing the smart key. Further, since a plurality of the registration authentication codes can be stored in each of the construction machines 100A, 100B, 100C, 100D, 100E, 100F, the use of multiple smart keys may be possible. Therefore, a plurality of personnel can easily operate or manage the construction machine.

Hereinafter, a method of registering the smart key at the smart key module which is installed in any one of a plurality of construction machines in the control system for construction machinery in FIG. 1 will be explained.

Figure 7A:
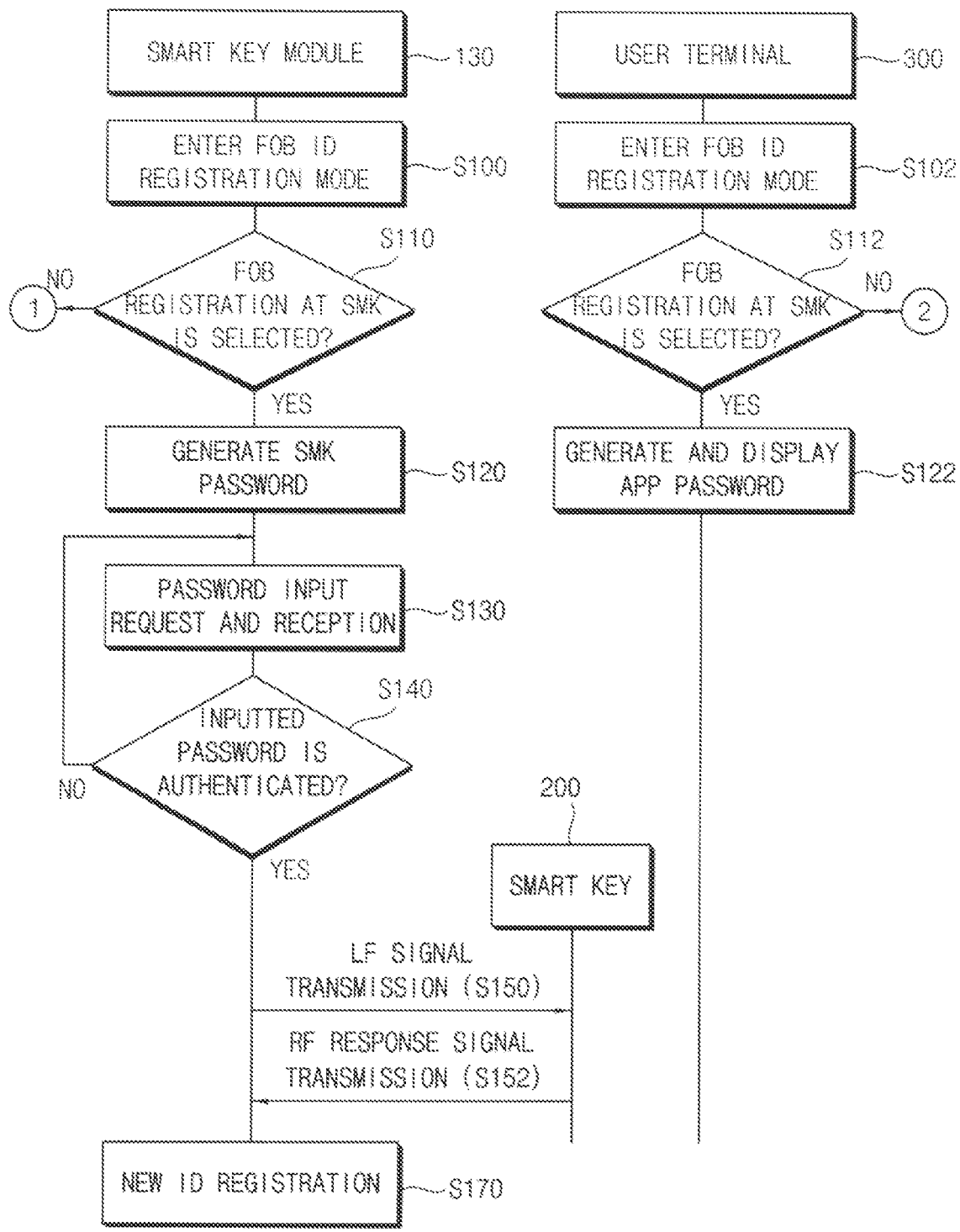
FIGS. 7A and 7B are flow charts illustrating a registration method of a smart key for construction machinery in accordance with example embodiments.
Figure 7B:
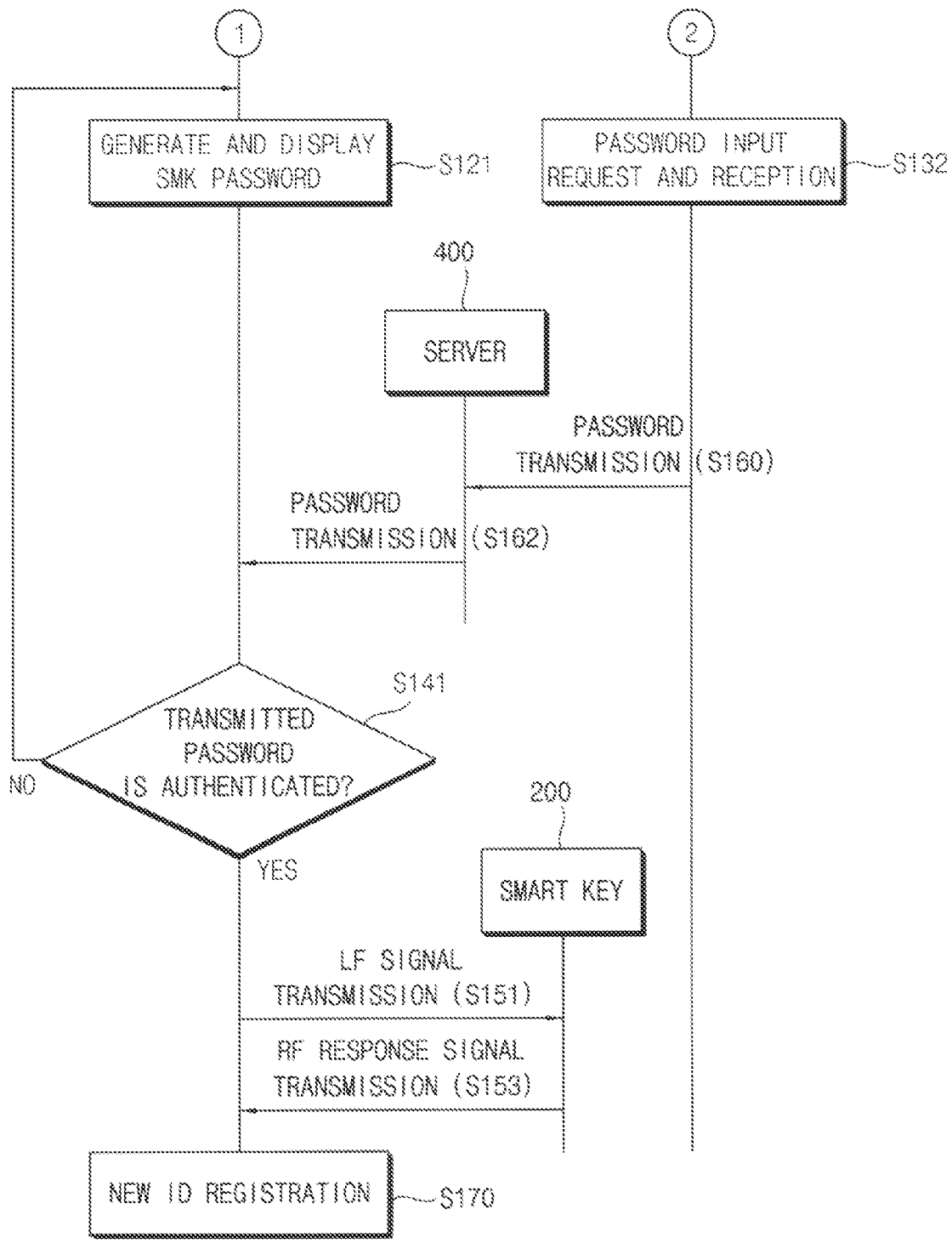

FIGS. 7A and 7B are flow charts illustrating a registration method of a smart key for construction machinery in accordance with example embodiments. FIGS. 8A to 8D are screens provided through an input portion of a smart key module in a smart key registration mode. FIGS. 9A to 9E are views illustrating screens provided through an input portion of a user terminal in a smart key registration mode.

Referring to FIGS. 1 to 9E, first, a smart key (FOB ID) registration mode is entered in the smart key module (SMK) 130 installed in the construction machine 100A (S100), and a smart key (FOD ID) registration mode is entered in the user terminal (APP) 300 (S102).

Figure 8A:
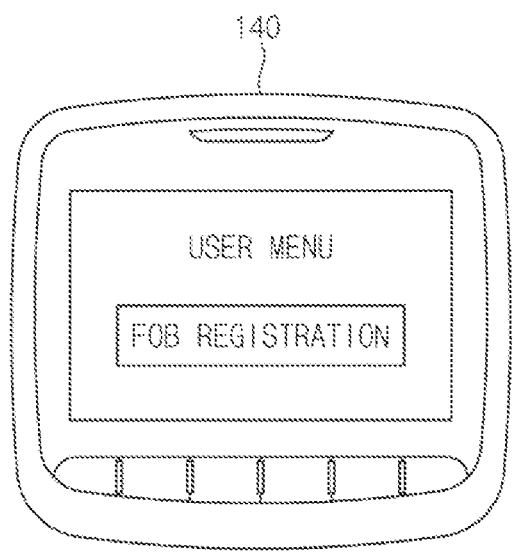
FIGS. 8A to 8D are screens provided through an input portion of a smart key module in a smart key registration mode.
Figure 9A:
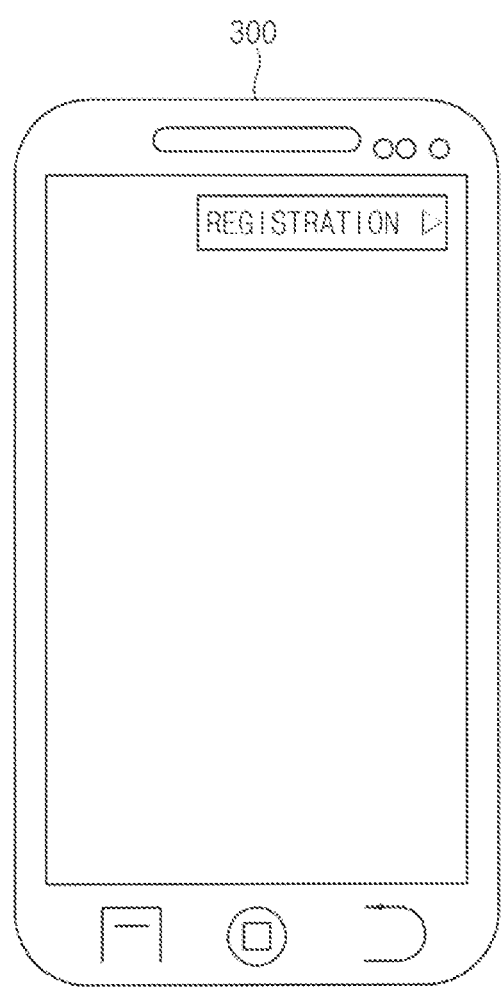
FIGS. 9A to 9E are views illustrating screens provided through an input portion of a user terminal in a smart key registration mode.

In example embodiments, as illustrated in FIGS. 8A and 9A, the user interface device 140 of the construction machine and the user terminal 300 may provide the user with a user menu for inquiring whether or not to enter the smart key (FOB ID) registration mode. If the user's entry request of the smart key registration mode is selected, the smart key (FOB ID) registration mode may be switched.

Figure 8B:
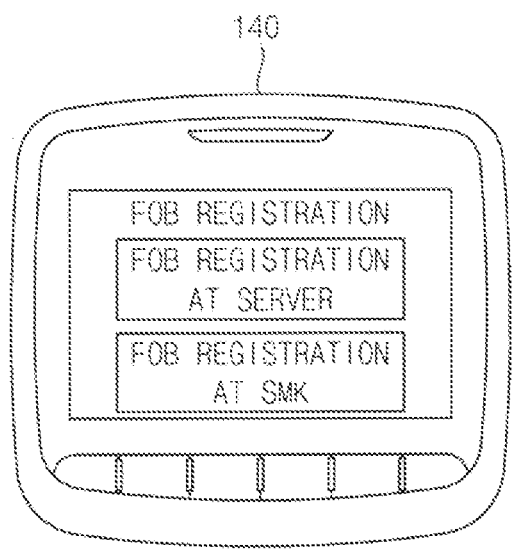
Figure 9B:
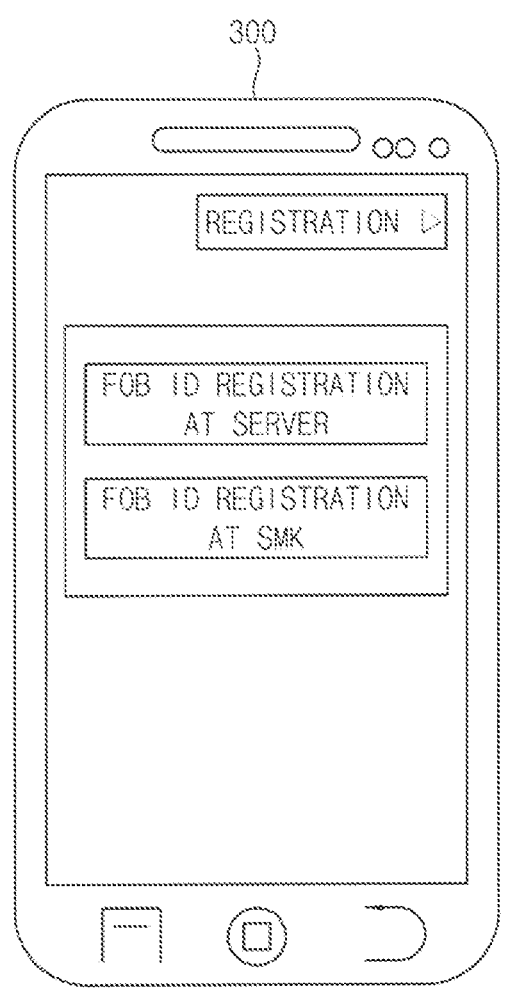

As illustrated in FIGS. 8B and 9B, when the smart key registration mode is started, the user interface device 140 of the construction machine and the user terminal 300 may provide the user with a user menu for inquiring whether or not to proceed with the smart key registration (S110, S112).

Figure 9C:
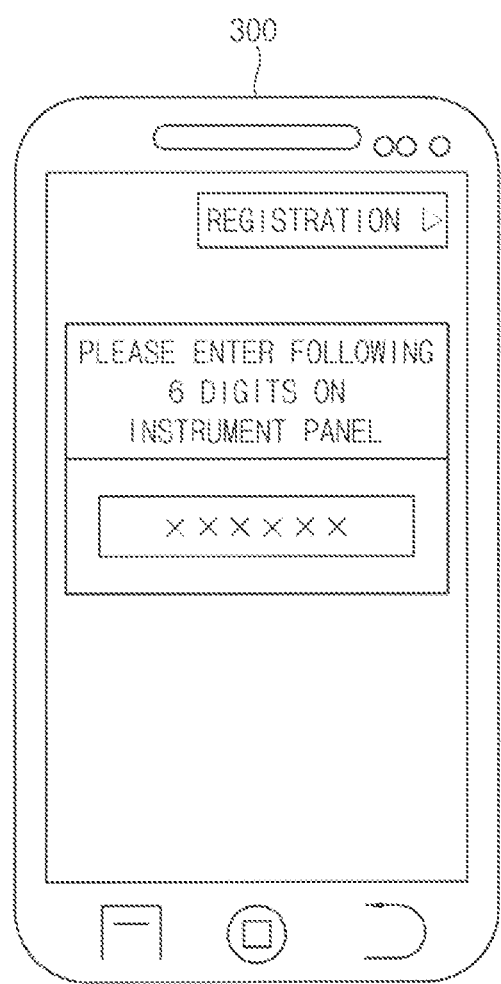

As illustrated in FIG. 7A, when the user chooses to proceed with the smart key registration through the user interface device 140 of the construction machine (FOB REGISTRATION AT SMK), the module controller 134 of the smart key module 130 may generate a first password (S120). Additionally, as illustrated in FIG. 9C, the user terminal 300 may generate and provide a second password identical to the first password to the user (S122).

In example embodiments, the first password generation portion 135 of the smart key module 310 and the user terminal 300 may create cryptographic variables using AES algorithm or RSA algorithm. The first password generation portion 135 of the smart key module 310 and the user terminal 300 may generate the passwords by combining construction machinery information, date and time. In this case, the user terminal 300 may perform the smart key registration mode in a state in which security is maintained through AES encryption even in a situation where communication is not available.

Figure 8C:
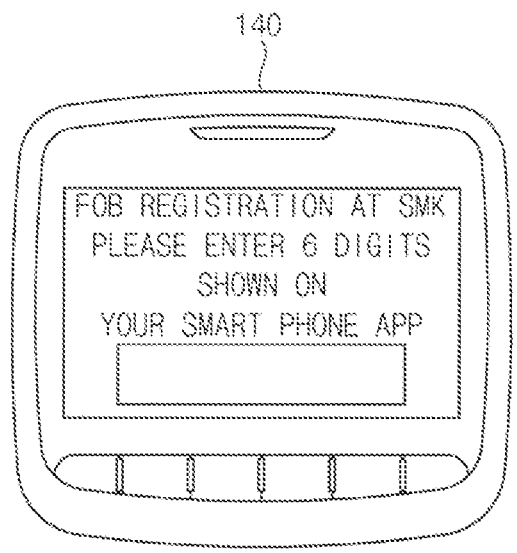

Then, as illustrated in FIG. 8C, the user interface device 140 of the construction machine may ask the user to input a password the same as the second password provided by the user terminal 300 (S130), and the smart key module 310 may compare the password inputted through the input portion 132 to authenticate (S140).

The authentication portion 136 of the smart key module 310 may compare the first password generated by the first password generation portion 135 and the password which is inputted through the user interface device 140 of the construction machine each other to authenticate.

Then, when the inputted password is authenticated, the authentication code of the near smart key 200 that is recognized by the smart key module 130 may be registered as a new registration authentication code (S170).

In particular, the communication portion 131 of the smart key module 130 may transmit a search signal (LF signal) (S150), and the communication portion 210 of the smart key module 200 may transmit a response signal (RF signal) in response to the search signal (S152). In order to increase the accuracy of the RF information transmission and reception, the transmission of the response signal may proceed by contacting the smart key 200 with a specific position within a cabin of the construction machine. An RF transceiver which is connected to be capable of transmitting and receiving information with the smart key module 130 and transmitting and receiving an RF signal of the smart key 200 may be disposed at the specific location. In example embodiments, the RF transceiver may be a button type start key provided in the cabin.

In example embodiments, the response signal may include authentication information of the smart key 200, that is, the activated authentication code of the authentication codes stored in the smart key 200. The smart key module 130 may store the activated authentication code of the smart key 200 as a new registration authentication code when authenticated by the authentication portion 136.

Figure 8D:
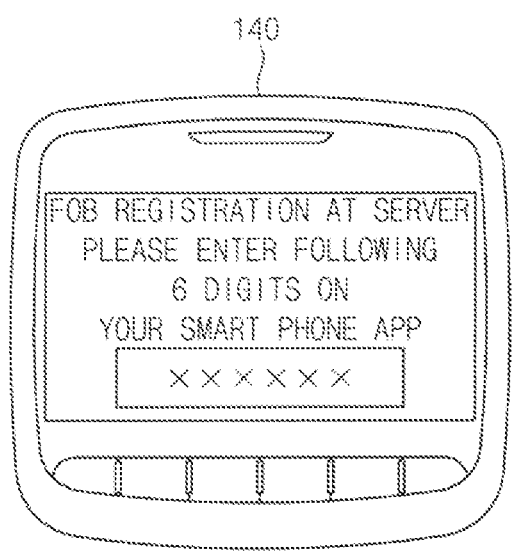

As illustrated in FIG. 7B, when the user chooses to proceed with the smart key registration through the user terminal 300 (FOB REGISTRATION AT SERVER), as illustrated in FIG. 8D, the smart key module 130 may generate and provide a first password to the user (S121).

In example embodiments, the first password generation portion 135 of the smart key module 310 may create cryptographic variables using AES algorithm or RSA algorithm. The first password generation portion 135 of the smart key module 310 may generate the password by combining construction machinery information, date and time.

Figure 9D:
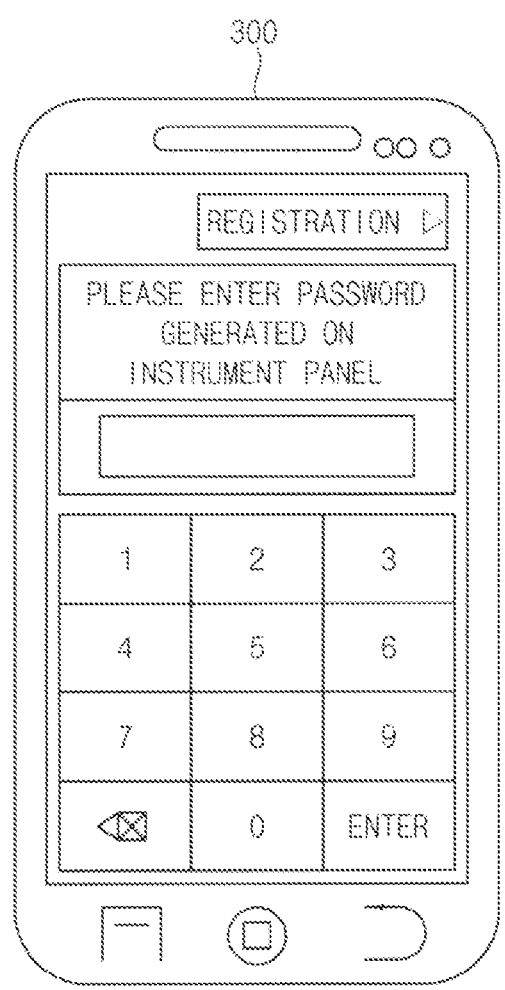
Figure 9E:
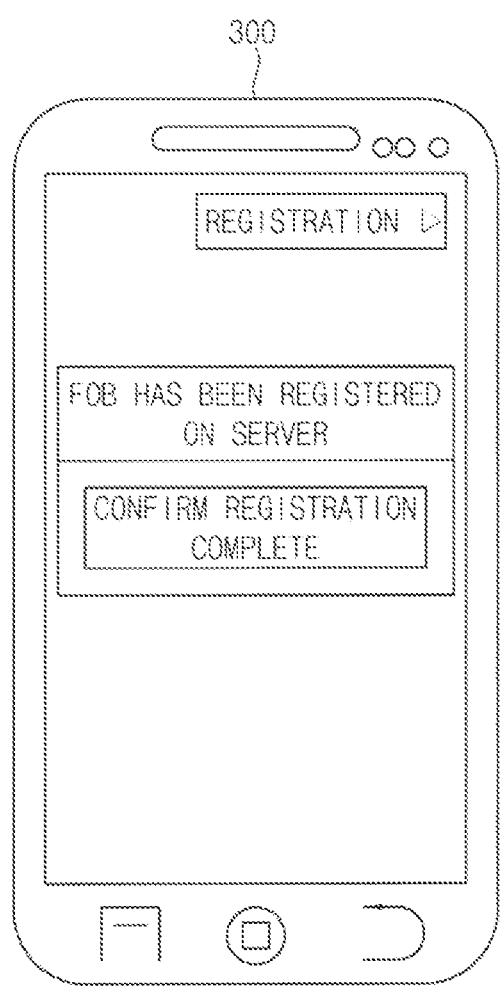

Then, as illustrated in FIG. 9D, the user terminal 300 may ask the user to input a password the same as the first password provided by the smart key module 130 (S132), and the user terminal 300 may transmit the inputted password to the remote control server 400 (S160), the remote control server 400 may transmit the password to the smart key module 130 through the remote management device 120 (S162). Then, the smart key module 310 may compare the password inputted through the remote management device 120 to authenticate (S141).

The authentication portion 136 of the smart key module 310 may compare the first password generated by the first password generation portion 135 and the password which is inputted through the user terminal 300 each other to authenticate.

Then, when the inputted password is authenticated, the authentication code of the near smart key 200 that is recognized by the smart key module 130 may be registered as a new registration authentication code (S170).

In particular, the communication portion 131 of the smart key module 130 may transmit a search signal (LF signal) (S151), and the communication portion 210 of the smart key module 200 may transmit a response signal (RF signal) in response to the search signal (S153).

In example embodiments, the response signal may include authentication information of the smart key 200, that is, the activated authentication code of the authentication codes stored in the smart key 200. The smart key module 130 may store the activated authentication code of the smart key 200 as a new registration authentication code when authenticated by the authentication portion 136.

When the activated authentication code of the smart key 200 is registered, the input portion 132 of the smart key module 130 and the construction machine control APP of the user terminal 300 may provide the user with a user menu for inquiring whether or not to exit the smart key (FOB ID) registration mode, and by confirming by the user, the smart key (FOB ID) registration mode may be terminated.

As mentioned above, identical passwords may be generated in the smart key module 130 and the user terminal 300 respectively and the generated password may be inputted through another device (user terminal or smart key module) and authenticated, to thereby allow the user to easily register the smart key at the smart key module mounted on the construction machine using the user terminal such as a mobile phone while maintaining security. Security may be enhanced using AES encryption. Further, regardless of whether the communication of the user terminal is available or not, the smart key registration may be performed while maintaining security thoroughly.

The present invention has been explained with reference to preferable embodiments, however, those skilled in the art may understand that the present invention may be modified or changed without being deviated from the concept and the scope of the present invention disclosed in the following claims.

THE DESCRIPTION OF THE REFERENCE NUMERALS

10: control system for construction machinery
100A, 100B, 100C, 100D, 100E, 100F: construction machine
110: GPS module 120: remote management device
130: smart key module 131: communication portion
132: input portion 134: module controller
138: module storage portion 200: smart key
210: communication portion 220: input portion
230: smart key controller 240: smart key storage portion
300: user terminal 310: construction machine control APP
400: remote control server

The invention claimed is:

1. A method of registering a smart key for construction machinery, the method comprising:
when a user chooses to proceed with smart key registration through a smart key module mounted in a construction machine, generating a first password in the smart key module;
providing a user setting graphic interface through which the user inputs a password, in the smart key module, to the user;
generating and providing a second password identical to the first password, in a user terminal, to the user;
receiving a password that is inputted by the user through the user setting graphic interface, in the smart key module;
comparing the password inputted by the user with the first password in the smart key module to authenticate; and
registering an authentication code of a near smart key that is recognized by the smart key module as a new registration authentication code when the inputted password is authenticated.

2. The method of claim 1, wherein generating the first password comprises creating cryptographic variables by combining construction machinery information, date and time.

3. The method of claim 1, wherein generating the first password comprises creating cryptographic variables using AES algorithm or RSA algorithm.

4. The method of claim 1, wherein generating the second password comprises creating cryptographic variables by combining construction machinery information, date and time.

5. The method of claim 1, wherein generating the second password comprises creating cryptographic variables using AES algorithm or RSA algorithm.

6. A method of registering a smart key for construction machinery, the method comprising:
when a user chooses to proceed with smart key registration through a user terminal, generating a first password in a smart key module mounted in a construction machine and providing the first password to the user;
providing a user setting graphic interface through which the user inputs a password, in the user terminal to the user;
when the user setting graphic interface in the user terminal is provided, allowing the user to input a password the same as the first password through the user setting graphic interface, in the user terminal;
transmitting the password inputted by the user to a server by the user terminal;
receiving the password inputted by the user from the server in the smart key module;
comparing the password inputted by the user with the first password in the smart key module to authenticate; and
registering an authentication code of a near smart key that is recognized by the smart key module as a new registration authentication code when the inputted password is authenticated.

7. The method of claim 6, wherein receiving the inputted password from the server in the smart key module comprises receiving the inputted password through a remote management device which communicates wirelessly with the server.

8. A method of registering a smart key for construction machinery, the method comprising:
generating a first password in a smart key module mounted in a construction machine;
providing a user setting graphic interface through which a user inputs a password, in the smart key module or a user terminal, to the user;
comparing the password inputted by the user with the first password in the smart key module to authenticate; and
registering an authentication code of a near smart key that is recognized by the smart key module as a new registration authentication code when the inputted password is authenticated,
wherein registering the authentication code of the near smart key that is recognized by the smart key module as the new registration authentication code comprises:
transmitting an authentication signal in the smart key module to an area around the construction machine; and receiving a response signal in response to the authentication signal to register an activated authentication code of the near smart key as the new registration authentication code.

9. The method of claim 8, wherein registering the activated authentication code of the near smart key comprises:
   storing a plurality of authentication codes in the smart key; and
   activating any one of the authentication codes.

* * * * *